United States Patent
Neubauer et al.

(10) Patent No.: US 9,061,459 B2
(45) Date of Patent: Jun. 23, 2015

(54) APPARATUS AND METHOD FOR TRANSFORMING PLASTIC PREFORMS INTO PLASTIC CONTAINERS, WITH COUPLED PIVOTING AND LOCKING MOVEMENTS

(75) Inventors: Michael Neubauer, Regensburg (DE); Florian Geltinger, Donaustauf (DE)

(73) Assignee: KRONES AG, Neutraubling (DE)

( * ) Notice: Subject to any disclaimer, the term of this patent is extended or adjusted under 35 U.S.C. 154(b) by 537 days.

(21) Appl. No.: 13/447,156

(22) Filed: Apr. 13, 2012

(65) Prior Publication Data
US 2012/0261865 A1    Oct. 18, 2012

(30) Foreign Application Priority Data
Apr. 13, 2011    (DE) .......................... 10 2011 016 854

(51) Int. Cl.
*B29C 49/36* (2006.01)
*B29C 49/46* (2006.01)
*B29C 49/56* (2006.01)

(52) U.S. Cl.
CPC ................. *B29C 49/56* (2013.01); *B29C 49/46* (2013.01); *B29C 2049/4679* (2013.01); *B29C 2049/4697* (2013.01)

(58) Field of Classification Search
CPC   B29C 49/36; B29C 49/56; B29C 2049/4697; B29C 2049/566
USPC .............. 264/523, 538; 425/540, 541; 65/360
See application file for complete search history.

(56) References Cited

U.S. PATENT DOCUMENTS

| | | | |
|---|---|---|---|
| 7,341,443 B2 * | 3/2008 | Lemaistre et al. ............. | 425/540 |
| 7,384,261 B2 * | 6/2008 | Mie et al. ....................... | 425/540 |
| 8,029,270 B2 * | 10/2011 | Baumgarte et al. ........... | 425/540 |
| 2006/0275525 A1 * | 12/2006 | Lemaistre et al. ............. | 425/541 |
| 2010/0272844 A1 * | 10/2010 | Dordoni ......................... | 425/210 |
| 2011/0280984 A1 * | 11/2011 | Hoellriegl et al. ............. | 425/541 |

FOREIGN PATENT DOCUMENTS

| | | |
|---|---|---|
| DE | 10 2007 022 638 A1 | 11/2008 |
| EP | 1 473 139 A1 | 11/2004 |
| EP | 1 535 719 A1 | 6/2005 |
| EP | 2246176 A1 * | 11/2010 |
| WO | WO 2010069808 A2 * | 6/2010 |

OTHER PUBLICATIONS

European Search Report dated Jul. 9, 2012 corresponding to European Application No. 12162827.5.

* cited by examiner

*Primary Examiner* — Robert B Davis
(74) *Attorney, Agent, or Firm* — Kratz, Quintos & Hanson, LLP (57) ABSTRACT

Apparatus for transforming plastic preforms into containers includes a blow molding station arranged on a movable carrier. The station includes a carrier for holding a blow mold, and the carrier includes a first part and a second part, pivotable with respect to the first part relative to a predefined first pivot axis. The station includes a lock mechanism for locking the first part with respect to the second part. Lock mechanism includes a first element arranged on the first part and a second element arranged on the second part. At least the first element is movable with respect to the carrier relative to a second predefined axis. Pivoting movement of the first part and movement of the first element are coupled to one another by a coupling device such that the second axis moves with respect to the carrier in a direction perpendicular to the second axis.

17 Claims, 5 Drawing Sheets

PRIOR ART  Fig. 3a

PRIOR ART  Fig. 3b

APPARATUS AND METHOD FOR TRANSFORMING PLASTIC PREFORMS INTO PLASTIC CONTAINERS, WITH COUPLED PIVOTING AND LOCKING MOVEMENTS

CROSS-REFERENCE TO RELATED APPLICATION

This application claims the benefit of priority of German Patent Application No. 10 2011 016 854.0, filed Apr. 13, 2011, pursuant to 35 U.S.C. 119(a)-(d), the disclosure of which is incorporated herein by reference.

TECHNICAL FIELD

The present disclosure relates to an apparatus for transforming plastic preforms into plastic containers.

BACKGROUND

Apparatuses for transforming plastic preforms into plastic containers have been known for some time from the prior art. Usually, in a plurality of blow moulding stations, plastic preforms are transformed into plastic containers as a result of being acted upon by compressed air. During the expansion process, a number of movement processes take place alongside one another. For instance, usually the blow mould carrier halves are unfolded from one another in order to introduce a plastic preform and then are folded together in order to be able to carry out the expansion process. At the end of the expansion process, the blow mould carrier parts are unfolded from one another again in order thus to be able to remove the finished, blow-moulded plastic container. In the closed state of the blow mould carrier parts, particularly during the expansion process, the blow mould carrier parts are additionally locked to one another in order thus to be able to withstand the not inconsiderable pressures.

Also known from the prior art are sterile applications in which the individual blow moulding stations are guided inside a clean chamber. For example, there is described in WO 2010/020529 A2 an apparatus for transforming plastic preforms into plastic containers, having a transport device, which comprises a plurality of blow moulding stations, and a clean chamber.

By means of the clean chamber, aseptic conditions can be ensured during the production of the plastic containers and also during the filling thereof with beverages.

The subject matter of WO 2010/020529 A2 is hereby fully incorporated by way of reference in the subject matter of the present disclosure.

In some countries, guidelines are set for such aseptic treatments. In the USA, for example, such guidelines are set and monitored by the FDA (Food and Drug Administration).

As mentioned above, one important component of a blow moulding station is in each case the lock mechanism which connects or locks the two mould carrier halves to one another during the blow moulding process. At the end of the blow moulding process, the lock opens. Once the mould has opened, the bottle can be removed and a new preform can be introduced. In the prior art, this lock mechanism usually comprises a lock shaft which is mounted in one of the two mould carriers. A plurality of bearing points distributed along the height of the mould carrier ensure a uniform distribution of force in the components. This is important since the lock has to absorb a retaining force of several 10 000 N. The locking process consists for example of a rotational or linear movement of the lock. This movement is usually generated by a stationary cam fixed to the basic structure of the machine and is transmitted to the lock shaft via various deflections.

The opening and closing movement of the mould carrier is controlled independently and separately from this. Since in the prior art the two mould carrier halves are opened by the same angle, they are mechanically connected via various levers and deflections. Actuation takes place via a cam. Two cams are therefore required for the actuation as a whole, one for controlling the two mould carrier halves and one for controlling the lock.

It may therefore be desirable to simplify the actuation mechanism for such blow moulding machines.

SUMMARY

According to various aspects of the disclosure, an apparatus for transforming plastic preforms into plastic containers comprises at least one blow moulding station arranged on a movable carrier, wherein this blow moulding station comprises a blow mould carrier for holding a blow mould and this blow mould carrier comprises a first blow mould carrier part and a second blow mould carrier part which is pivotable with respect to the first blow mould carrier part relative to a predefined first pivot axis in order to open and close the blow mould, and wherein the blow moulding station furthermore comprises a lock mechanism for locking the first blow mould carrier part with respect to the second blow mould carrier part. Furthermore, the lock mechanism comprises a first lock element arranged at least indirectly on the first blow mould carrier part and a second lock element arranged at least indirectly on the second blow mould carrier part, wherein the lock elements cooperate in a locked state of the blow mould carrier parts, and wherein at least the first lock element is movable with respect to the carrier relative to a second predefined axis.

According to various aspects of the disclosure, the pivoting movements of the first blow mould carrier part and the movements of the first lock element are coupled to one another by means of a coupling device in such a way that, at least at times during a movement of the first lock element relative to the second predefined axis, the second predefined axis moves with respect to the carrier in a direction perpendicular to the second axis.

An at least indirect arrangement of the respective lock element on the blow mould carrier part is understood to mean that this lock element is arranged for example directly on the respective blow mould carrier part or is arranged for example on a further element or component, with respect to which the respective blow mould carrier part is also arranged in a stationary manner. For instance, one lock element could be arranged in a stationary manner with respect to the carrier and the blow mould carrier part associated therewith could be arranged likewise in a stationary manner with respect to the carrier.

In this case, it is conceivable that one lock element is rigidly arranged with respect to the respective blow mould carrier part and the other is movable in a defined manner, e.g. pivotable. In some aspects, however, at least one lock element is arranged directly on its associated blow mould carrier part and with particular preference the two lock elements are each arranged on their associated blow mould carrier parts.

In a further exemplary embodiment, the second predefined is a pivot axis and the first lock element is pivotable relative to this second pivot axis, which is in some aspects arranged in a stationary manner with respect to the first blow mould carrier part.

In some aspects, said first lock element also moves with this (pivot) axis, which first lock element, as mentioned above, is in some aspects arranged such as to be able to pivot relative to said pivot axis. In some aspects, the movable carrier is a rotatable carrier, such as a blow moulding wheel for example. In a further exemplary embodiment, a plurality of such blow moulding stations are arranged on this carrier.

In a further exemplary embodiment, the first lock element is movable along the axis. In this embodiment, the first lock element could be a rod-like or bolt-like body which is displaced in its longitudinal direction in order for example to engage in corresponding recesses or sleeve-like bodies for locking purposes.

In a further exemplary embodiment, the coupling device which couples the (pivoting) movement of the first blow mould carrier part and of the first lock element to one another is a mechanical coupling device, i.e. said two pivoting movements and the displacement movements are mechanically coupled to one another. In some aspects, therefore, the pivoting movement of the lock element and the pivoting movement of the first blow mould carrier part are coupled to one another by a common mechanism.

In a further exemplary embodiment, the apparatus comprises a clean chamber which is separated from a surrounding environment by at least one wall and inside which the blow moulding station is moved. This embodiment is particularly relevant for an aseptic blow moulding machine, in which the blow moulding station is transported inside said clean chamber. In one exemplary embodiment, the clean chamber is at least partially formed also by said carrier. For instance, the carrier may in some aspects have a C-shaped outer profile, inside which the individual blow moulding stations are at least partially arranged. In some aspects, the abovementioned coupling device is arranged outside the clean chamber, for example below the clean chamber.

In a further exemplary embodiment, the second blow mould carrier part is also pivotable relative to a predefined pivot axis. In one exemplary embodiment, the first mould carrier part and the second mould carrier part are pivoted about a common geometric axis. However, it would also be possible that the pivot axis about which the first blow mould carrier part is pivoted is parallel to the pivot axis about which the second blow mould carrier part is pivoted. In some aspects, these pivot axes run parallel to a longitudinal direction of the plastic preform to be expanded.

In a further exemplary embodiment, the first blow mould carrier part is pivotable through a first predefined pivot angle and the second blow mould carrier part is pivotable through a second predefined pivot angle, and the second pivot angle is larger than the first pivot angle.

In most known blow moulding machines, particularly stretch blow moulding machines, the two mould carrier halves are opened (pivoted open) approximately by the same angle in order to be able to remove the bottle and introduce the plastic preform. However, it may sometimes also be useful to make (considerably) asymmetric the required opening movement of the mould carriers. In this case, one mould carrier half pivots open much further than the other. In this case, an actuation of the two mould carrier halves may in some aspects take place separately.

The blow mould is thus opened asymmetrically and in some aspects the movement of the first blow mould carrier part serves only for releasing a bottom part of the blow mould and the movement of the second blow mould carrier part serves for removing the plastic containers. In some aspects, the first blow mould carrier part is pivoted through an angle of between 1° and 10°, in some aspects between 1° and 8°, in some aspects between 2° and 6°, and in some aspects between 2° and 4°.

In some aspects, the lock shaft is also mounted in or on the blow mould carrier part which is pivoted through the smaller angle. Once the two mould halves have been closed, said lock shaft must carry out a rotational movement and thus lock the two blow mould carriers.

In some aspects, the second blow mould carrier part is pivoted through an angle of between 20° and 60°, in some aspects between 30° and 50°, in some aspects between 35° and 45°, and in some aspects around 40°. In some aspects, a pivoting shaft which defines the pivot axis extends through a wall which in particular also delimits the clean chamber, and the movements of the pivoting shaft are in some aspects sealed off by means of a sealing device.

For this purpose, said wall in some aspects has a through-opening, through which the pivoting shaft extends. The pivoting shaft is in some aspects not only rotatable with respect to this opening but is also movable perpendicular to said axis. In some aspects, the sealing device is arranged on one side against the shaft and on the other side against said wall. This sealing device is in some aspects able to absorb both rotational movements through a predefined angle and (displacement) movements of the pivoting shaft in a direction perpendicular to the pivoting shaft. The sealing device is in some aspects made of a plastic. The pivoting shaft is in some aspects movable along a curved path with respect to the carrier.

In a further exemplary embodiment, the coupling device comprises a lever for pivoting the blow mould carrier part relative to the first pivot axis. This lever in some aspects extends at least partially in a direction perpendicular to the pivoting shaft. There may for example be arranged on this lever a cam roller which is able to cooperate with a guide cam which in particular is arranged in a stationary manner.

However, other types of drive would also be conceivable, such as for example electric motors, pneumatic drives, hydraulic drives and the like.

In a further exemplary embodiment, the coupling device comprises a lever arm which is arranged on a pivoting shaft, which defines the pivot axis, in a manner such as to rotate therewith (i.e., non-rotatably with respect to the pivot axis) and is arranged in a manner articulated to a further pivoting arm. By virtue of this articulated design, a coupling between the pivoting movement of the lock element and the displacement movement of the pivoting shaft or pivot axis itself, particularly along a circular path, is possible. In some aspects, therefore, the pivoting shaft for the lock mechanism is displaced along a circular path, wherein this circular path is in turn obtained by the pivoting movement of the first blow mould carrier part.

The present disclosure also relates to a method for transforming plastic preforms into plastic containers, wherein the plastic preform is transformed into the plastic container in a blow moulding station arranged on a movable carrier, and wherein the blow moulding station comprises a first blow mould carrier part, which is pivotable relative to a first pivot axis, and a second blow mould carrier part, and wherein the first blow mould carrier part and the second blow mould carrier part are locked with respect to one another by means of a lock mechanism, and wherein, in order to lock the blow mould carrier parts, a first lock element carries out a movement relative to a second axis.

According to various aspects of the disclosure, the second axis at least at times, during the movement of the first lock element, moves with respect to the carrier in a direction perpendicular to the second axis. In some aspects, the second axis moves with respect to the carrier along a path in the shape of a segment of a circle. In some aspects, the movement of the first lock element and the movement of the second axis coincide fully in time terms.

In some aspects, the first lock element carries out a pivoting movement relative to a predefined pivot axis. In a further exemplary embodiment, however, it would also be conceivable that the first lock element carries out a movement along said axis (i.e. in particular a rectilinear movement).

In some aspects, the (pivoting) movement of the lock element and the displacement movement of the pivot axis are coupled to one another by means of a coupling device.

In a further exemplary method, the first blow mould carrier part and the second blow mould carrier part, during a process of opening the blow moulding station, reach their respective open positions at different points in time. In order to achieve this, it would for example be possible to trigger the movements of the first blow mould carrier part and of the second blow mould carrier part by means of independent drive devices. One advantage of this configuration lies in the fact that a bottom of the blow moulds can already be moved away as soon as the right-hand half (or the blow mould carrier part which carries out a smaller pivoting movement) is in its end position. The left-hand half, or the other blow mould carrier part, can at the same time still be in its opening movement. In this way, the opening times can be reduced. Correspondingly, also for the process of closing the blow mould, it would be possible that firstly just one blow mould carrier part moves and then both blow mould carrier parts just before the closed position is reached.

Further advantages and embodiments are apparent from the appended drawings.

BRIEF DESCRIPTION OF THE DRAWINGS

In the figures:
FIG. 3b shows a detail view of the apparatus shown in FIG. 3a.

DETAILED DESCRIPTION

Figure 1:
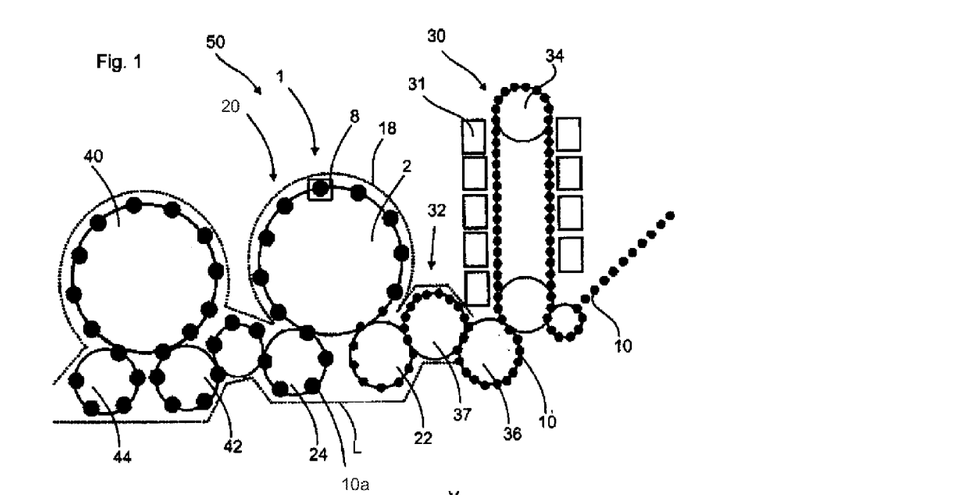
FIG. 1 shows a schematic diagram of an installation for producing plastic containers.

FIG. 1 shows a schematic diagram of an installation for producing plastic containers. This installation 50 comprises a heating device 30, in which plastic preforms 10 are heated. These plastic preforms 10 are guided through this heating device 30 by means of a transport device 34, such as in this case an endless chain, and in the process are heated by a plurality of heating elements 31. This heating device 30 is adjoined by a transfer unit 36 which transfers the preforms 10 to a sterilising device 32. Here, this sterilising device 32 likewise comprises a transport wheel 37, and sterilising elements may be arranged on this transport wheel 37 or else in a stationary manner. In this region, for example, a sterilisation by hydrogen peroxide gas or else by electromagnetic radiation is possible. In particular, an internal sterilisation of the preforms is carried out in this region.

Reference 20 denotes in its entirety a clean chamber, the outer boundaries of which are indicated here by the dotted line L. In a further exemplary embodiment, the clean chamber 20 is arranged not just in the region of the transport wheel 2 and filling device 40 but rather starts perhaps even in the region of the heating device 30, the sterilising device 32, the plastic preform feed and/or the plastic preform production. It can be seen that this clean chamber 20 starts in the region of the sterilising unit 32. In this region, lock devices may be provided for introducing the plastic preforms into the clean chamber 20 without too much gas inside the clean chamber flowing and thus being lost.

As indicated by the dotted line L, the clean chamber is adapted to the outer shape of the individual components of the installation. In this way, the volume of the clean chamber can be reduced.

Reference 1 denotes in its entirety a transforming apparatus in which a plurality of blow moulding stations or transforming stations 8 are arranged on a transport wheel 2, just one of these blow moulding stations 8 being shown here. By means of these blow moulding stations 8, the plastic preforms 10 are expanded to form containers 10a. Although not shown in detail here, the entire region of the transport device 2 is not located inside the clean chamber 20, but rather the clean chamber 20 or isolator is embodied, as it were, as a mini-isolator within the apparatus as a whole. For instance, it would be possible that the clean chamber is configured as a channel at least in the region of the transforming apparatus 1.

Reference 22 denotes a feed device which transfers the preforms to the transforming device 1, and reference 24 denotes a discharge device which discharges the produced plastic containers 20 from the transforming apparatus 1. It can be seen that the clean chamber 20 in the region of the feed device 22 and the discharge device 24 in each case has recesses which accommodate these devices 22, 24. In this way, a handover of the plastic preforms 10 to the transforming apparatus 1 and a pick-up of the plastic containers 10a from the transforming apparatus 1 can be achieved in a particularly advantageous manner.

By means of a transfer unit 42, the expanded plastic containers are transferred to a filling device 40 and then are conveyed away from this filling device 40 via a further transport unit 44. The filling device 40 is also located inside said clean chamber 20. In the case of the filling device, too, it would be possible that the entire filling device 40, including for example a reservoir for a beverage, is not fully arranged inside the clean chamber 6, but rather also in this case only those regions in which the containers are actually guided. The filling device could thus also be constructed in a manner similar to the apparatus 1 for transforming plastic preforms 10.

As mentioned, the clean chamber 20 in the region of the apparatus 1 is reduced to a size that is as small as possible, namely essentially to the blow moulding stations 8 themselves. By virtue of this small design of the clean chamber 20, it is more easily and quickly possible to create a clean chamber and also it is less difficult to keep it sterile in the operating phase. Moreover, less sterile air is required, which leads to smaller filter units and also the risk of uncontrolled vortex formation is reduced.

Figure 2:
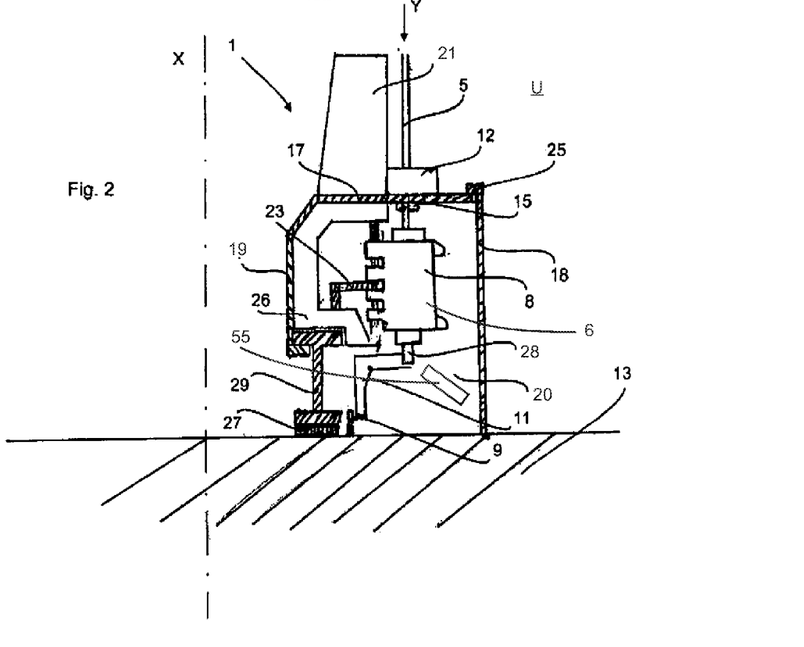
FIG. 2 shows a view of a clean chamber in the region of a blow moulding station.

FIG. 2 shows a detail view of the apparatus 1 in the region of a blow moulding station 8. A plurality of such blow moulding stations 8 are moved in rotation about an axis X by means of a transport device 2 or a carrier. As can be seen in FIG. 2, the blow moulding station 8 is guided inside the clean chamber 20, which is configured here in a channel-like manner. This clean chamber 20 is closed by a movable side wall 19 and a ceiling 17 formed in one piece with this side wall 19. This side wall 19 and the ceiling 17 rotate with the blow moulding station 8.

Reference 18 denotes a further wall which delimits the clean chamber 16. This wall 18 is in this case an outer wall which is arranged in a stationary manner. Provided between the ceiling 17 and the wall 18 is a sealing device 25 which seals off with respect to one another the elements 17 and 18 that can move relative to one another, for example, as mentioned above, by using a water lock. The lower region of the wall 18 is arranged fixedly and sealingly on a floor 13. Provided inside the clean chamber 20 and bearing here directly against the wall 19 is a carrier 26 which likewise moves in rotation and on which there is in turn provided a holding device 23 which holds the blow moulding station 8.

Reference 11 denotes a follower device which can be actuated by a guide cam 9 in order to open and close the blow moulding station on its way through the clean chamber 6 so as in particular to place the plastic preform into the blow moulding station and also remove it again therefrom. Here, a guide cam 9 is also arranged inside the clean chamber 20. However, it would for example also be possible to form a portion 11 below the individual blow moulding stations 8 outside the clean chamber 20.

The transport device 2 may comprise yet more elements which are arranged above the clean chamber 20.

The carrier 26 is in this case arranged fixedly on a holding body 29 and this holding body is in turn movable with respect to the floor 13. Here, reference 27 denotes a further sealing device which in this region, too, brings about a sealing of the regions 13 and 29 which are movable with respect to one another.

Reference 5 denotes a stretching rod which is movable with respect to the blow moulding station in order to stretch the plastic preforms 10 in their longitudinal direction. Here, there is arranged on the ceiling 17 a carriage 12, with respect to which the stretching rod is movable in the direction Y. Reference 21 denotes a further holder for this carriage 12 of the stretching rod 5.

It can be seen that certain regions of the stretching rod are both outside the clean chamber 20 and inside the clean chamber 20 during the blow moulding process. For this purpose, it is possible to provide outside the clean chamber 20 and/or above the carriage 12 a protective device such as a bellows which surrounds the stretching rod 5 so that no region of the stretching rod 5 comes into direct contact with the external environment. Reference U denotes the (unsterile) environment surrounding the clean chamber 20. Reference 28 denotes a carrier for carrying a bottom mould, which likewise forms part of the blow mould 4. This carrier is likewise movable in the direction Y.

Reference 55 denotes a sterilising device which here is in some aspects arranged inside the clean chamber 20 and serves for sterilising the individual transforming stations or parts of these transforming stations 8. This sterilising device 55 may apply for example hydrogen peroxide or another sterilising agent to the transforming stations 8. The sterilising device 55 may be arranged in a stationary manner and the transforming stations may move with respect to this sterilising device 55. This sterilising device or application device 55 may be located on the transport wheel 2 or on the stationary wall 18 or may in general be arranged in a stationary manner and may consist of nozzles or the like. Moreover, it may be advantageous to introduce sterile air into the clean chamber 20 via the ventilation system in order to sterilise the clean chamber 20.

The blow moulds (not shown) are arranged inside the blow mould carriers 6. More specifically, two blow mould carrier parts may be arranged, which are pivotable with respect to one another and in each case hold one blow mould part. By virtue of this pivoting process, the blow moulds can be opened in order to introduce plastic preforms and to remove finished, blow-moulded containers. These blow mould carriers and blow moulds are in this case likewise arranged inside the clean chamber.

However, it would also (unlike what is shown in FIG. 2) be possible in some aspects that the transport device 2 or the carrier has a C-shaped outer circumference which also partially forms the outer walls of the clean chamber. Here, therefore, this C-shaped clean chamber wall rotates with the transport device 2, i.e. the blow moulding wheel. In this embodiment, the lower boundary of the clean chamber is at a distance from the floor 13 and moves relative to the floor. In this way, the clean chamber can be made even smaller than what is shown in FIG. 2. A sealing of this C-shaped profile of the transport device, which here forms both an inner wall and a bottom and top cover of the clean chamber, in some aspects takes place only with respect to the outer wall of the clean chamber. This outer wall is in this case in some aspects arranged in a stationary manner.

Figure 3A:
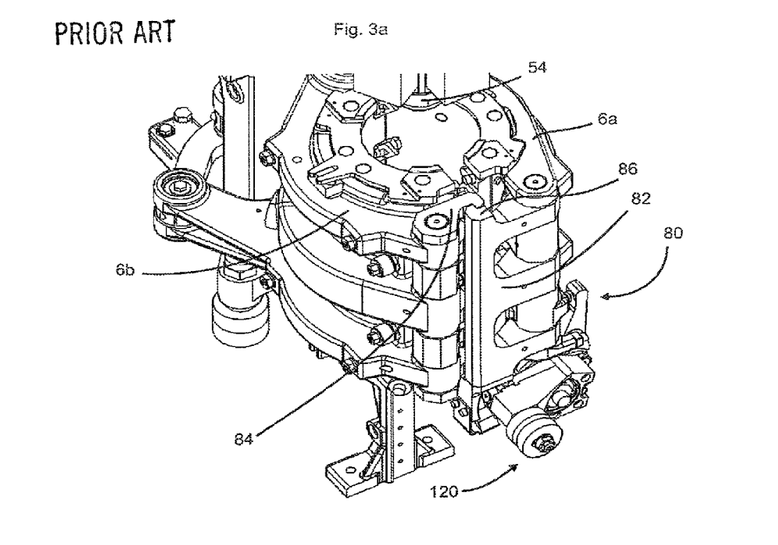
FIG. 3a shows a blow moulding station according to the prior art.

FIG. 3a shows a blow moulding station according to the prior art. This blow moulding station comprises a first blow mould carrier part 6a and a second blow mould carrier part 6b, these being able to be opened and closed. Reference 54 denotes a blowing nozzle for expanding the plastic preforms.

A first lock element 82 is arranged in a pivotable manner on the first blow mould carrier part 6a. A second lock element 84 is arranged on the second blow mould carrier part 6b. In a closed state, the first lock element 82 engages with an engagement portion 86 in the second lock element 84.

Reference 120 denotes an actuating mechanism for moving the lock element.

Figure 3B:
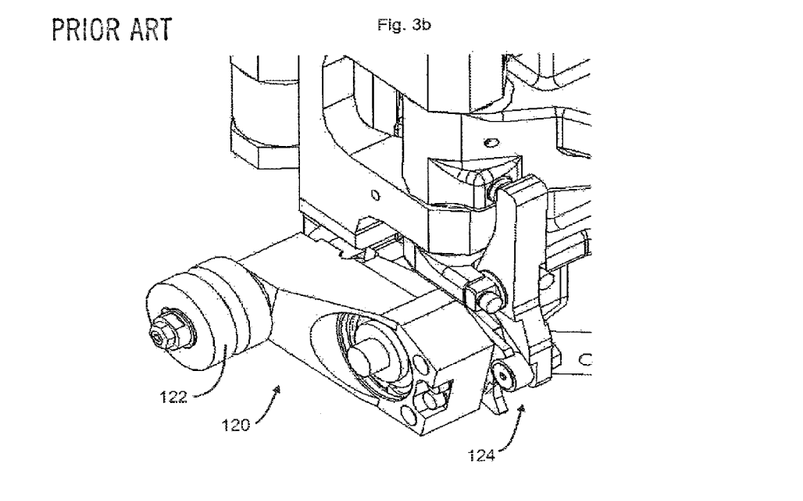

FIG. 3b shows a detail view of the apparatus shown in FIG. 3a. It can be seen that the actuating mechanism 120 comprises a cam roller 122 which rolls with respect to a guide cam (not shown). Reference 124 schematically denotes a latching mechanism which causes the lock element to latch either in the closed or in the open position.

Figure 4:
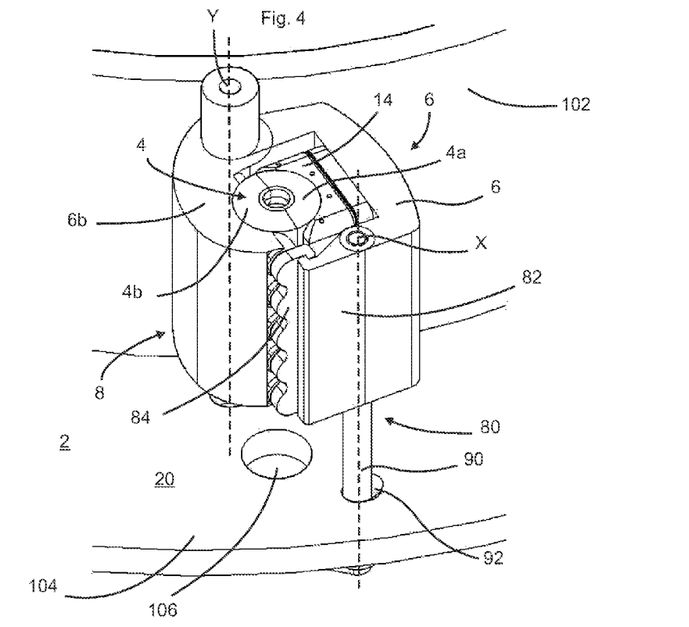
FIG. 4 shows a schematic diagram of a blow moulding station according to the disclosure.

FIG. 4 shows a blow moulding station 8 according to the disclosure. This blow moulding station 8 is arranged on the carrier 2. The carrier 2 comprises an inner wall 102 which at the same time forms a boundary of the clean chamber. This wall 102 has a circular outer circumference.

Reference 104 denotes a bottom wall of the carrier 2, which likewise forms a boundary of the clean chamber 20. Arranged in this bottom wall 104 is an opening 106, through which there can be passed a mechanical system by means of which the bottom mould (not shown) can be moved towards the blow mould.

The blow mould 4 comprises two blow mould parts 4a and 4b, which in a folded-together state form a cavity inside which the plastic preforms are expanded through the application of a fluid, e.g. compressed air.

The blow mould part 4a is arranged by means of a carrier shell 14 on a first blow mould carrier part 6a. A pressure cushion (not shown) may be provided which makes it possible for the blow mould part 4a to be pushed against the second blow mould part 4b when compressed air is applied.

The second blow mould part 4b is arranged on a second blow mould carrier part 6b. This second blow mould carrier part 6b is pivotable relative to a first pivot axis Y in order to open and close the blow mould.

A pivoting shaft for pivoting the blow mould carrier part 6b may be beared for example with respect to the carrier 2, wherein appropriate bearing devices are in some aspects arranged outside the clean chamber.

A second lock element 84 is arranged on the second blow mould carrier part 6b. Arranged on the first blow mould carrier part 6a is a first lock element 82 which is pivotable relative to a second pivot axis X. For pivoting this first lock element 82, there is provided a pivoting shaft 90 which is pivotable relative to a second pivot axis X. This pivoting shaft 90 extends here through an opening 92 which is arranged in the wall 104. Reference 80 denotes the lock mechanism in its entirety.

Figure 5A:
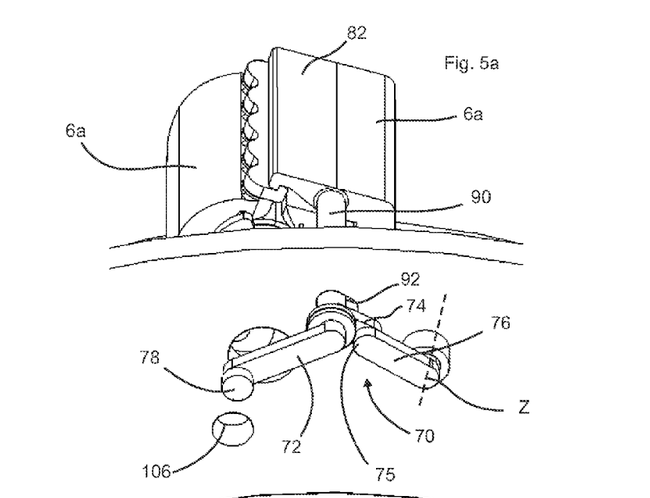
FIG. 5a shows the blow moulding station of FIG. 4 in a closed state.
Figure 5B:
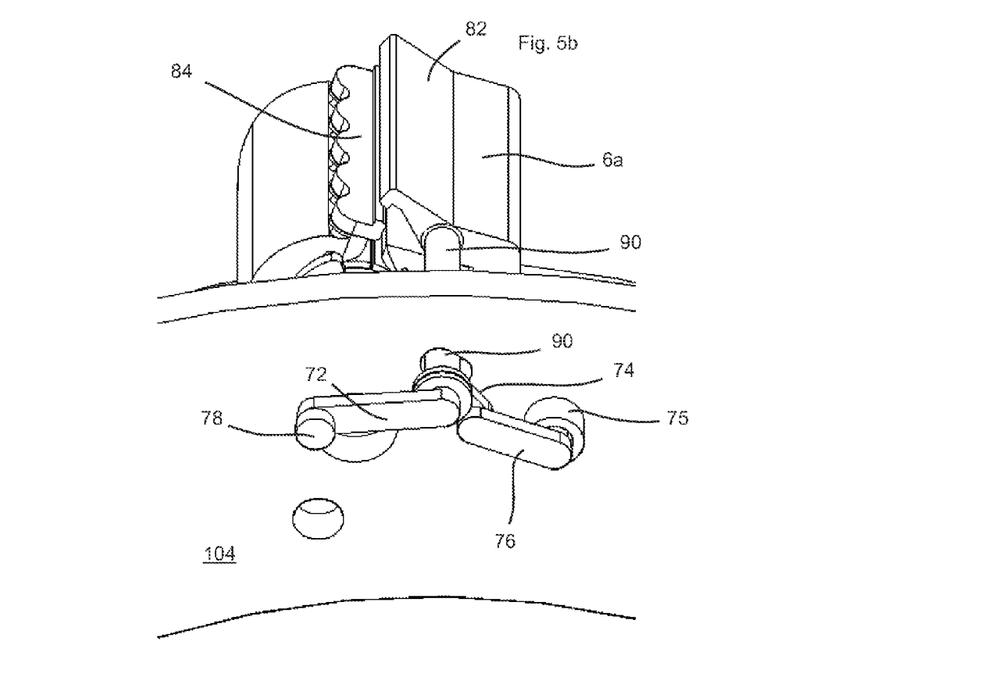
FIG. 5b shows the blow moulding station of FIG. 4 in a half-open state.
Figure 5C:
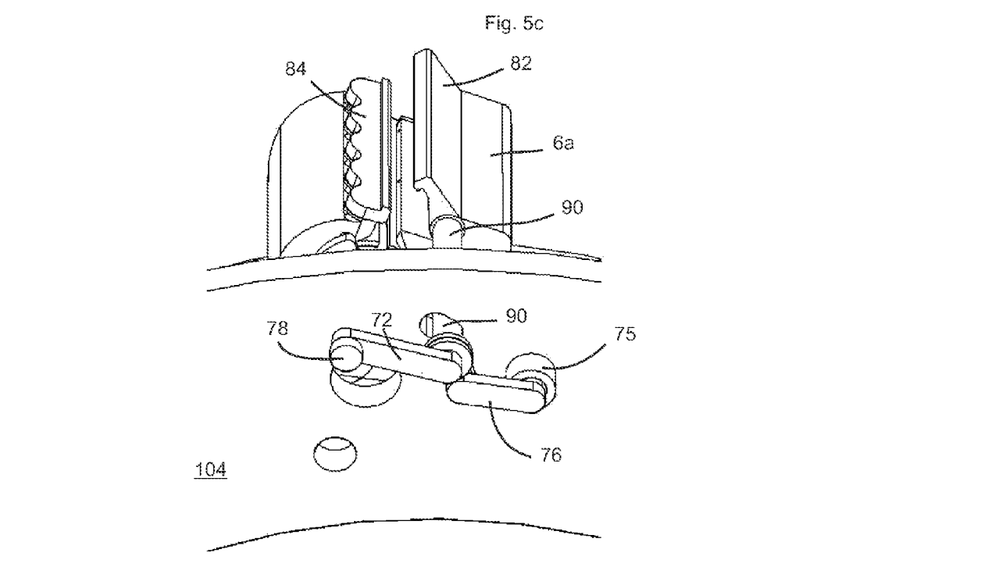
FIG. 5c shows the blow moulding station of FIG. 4 in an open state.

FIGS. 5a to 5c show three diagrams in different open positions of a blow moulding station 8 according to the disclosure. In the situation shown in FIG. 5a, the blow mould is closed and locked. Provided below the wall 104 and thus in some aspects also outside the clean chamber is a coupling device which is denoted as a whole by 70 and which couples a pivoting movement of the first lock element 82 to a pivoting movement of the first blow mould carrier part 6a. Reference 72 denotes a pivoting lever, on which there is arranged a cam roller 78, by means of which a pivoting of the pivoting shaft 90 is achieved.

By virtue of a pivoting of the lever 72, at the same time an arm 74 is also pivoted, said arm being connected in an articulated manner to a further arm 76. Reference 75 coarsely denotes a corresponding articulated connection between the arms 74 and 76. By virtue of a pivoting of the arm 74, the pivoting shaft 90 is also moved with respect to the opening 92 or is displaced in a direction perpendicular to the axis of rotation X. More specifically, the pivoting shaft 90 is moved along a path in the shape of a segment of a circle.

The lever 76 is arranged on a holding device and thus in some aspects on the wall 104 in a manner such as to be able to pivot relative to a third pivot axis Z.

In the appended figures, only one such blow moulding station is shown. Usually a plurality of these blow moulding stations are located on a carousel which in some aspects rotates. As can be seen in FIGS. 4 and 5a to 5c, the first carrier part is mounted via the main shaft. In turn, the lock shaft is rotatably mounted in the first mould carrier part. Arranged in turn on this lock shaft 90 are hooks 86 which cooperate or are in engagement with a corresponding lock hook of the second blow mould carrier part 6b when the lock is closed. As mentioned, the cam roller or actuating roller 78 is likewise connected to the lock shaft 90 via the lever 72. The cam roller is located in the machine in some aspects below the two blow mould carrier parts 6a and 6b.

During the opening process, in the case of a rotating carousel, the cam roller 78 is actuated by a cam (which is in particular arranged in a stationary manner). In the process, the lock shaft 90 rotates in the anticlockwise direction. In this way, the lock between the first lock element 82 and the second lock element 84 is released. In some aspects, the geometry of the lever arrangement is selected in such a way that firstly the first lock element moves almost exclusively forwards, i.e. away from the centre of the station, and then quickly to the right in order to quickly open the first blow mould carrier part 6a.

This situation is shown in FIG. 5b, which shows a half-open state. Here, the first lock element is already out of engagement with the second lock element 84 and the lock shaft 90 has moved only slightly relative to the opening 92.

When the cam roller 78 moves further, the lock shaft 90 also rotates further in the anticlockwise direction. By virtue of the lever 74 or the lock articulation 75, the entire blow mould carrier part 6a pivots in the anticlockwise direction. This situation is shown in FIG. 5c. The extent of the respective opening movement can be adapted to requirements by a shrewd choice of the lengths of the element 74 and of the element 76. The closing and locking of the blow moulding station takes place in the opposite order. In the situation shown in FIG. 5c, the left-hand blow mould carrier part 6b is shown in a closed state for the sake of better illustration. In actual fact, this blow mould carrier part would be unfolded wide open at this point in time.

One advantage of this construction lies in the fact that two movements, namely the movements of the first blow mould carrier part and of the lock shaft, can be controlled with just one cam. Furthermore, it is possible to execute the movements of the two mould carrier parts independently of one another. For example, the movement of the mould carrier part 6a can also end earlier than the movement of the second mould carrier part 6b. In the prior art, this is not possible due to the usually rigid coupling of the two mould carrier parts.

Figure 6:
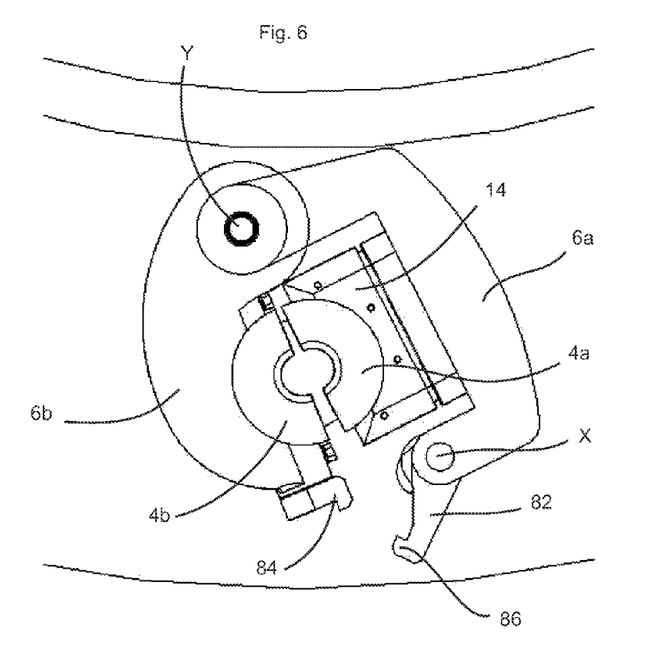
FIG. 6 shows a further plan view of a blow moulding station in an open state.

FIG. 6 shows a further plan view of a blow moulding station according to the disclosure. In this situation, both the lock element 82 is open and the first blow mould carrier part 6a is open and thus also the blow mould is open. For reasons of clarity, the second blow mould carrier part 6b is shown as still closed here. In practice, however, this blow mould carrier part would already be wide open at such a point in time, in order thus for example to be able to remove a finished, blow-moulded container or also to introduce a plastic preform.

It is therefore proposed that the movement of one or more mould carrier parts and the movements of the lock shaft are coupled to one another (in particular mechanically) via one or more levers and/or connecting articulations or other machine elements.

In some aspects, one blow mould carrier part 6a can move independently of another blow mould carrier part 6b. As a result, the movements of the two blow mould carrier parts can start at the same time or at different points in time and can end at the same time or at different points in time. In the examples shown above, it would be useful if the movements of the two mould carrier parts start at the same time but the movement of the first blow mould carrier part 6a ends earlier than the movement of the second blow mould carrier part 6b, since here the second blow mould carrier part 6b must carry out a larger pivoting movement or a larger pivot angle.

In a further exemplary embodiment, it would also be possible that the two mould carrier parts 6a and 6b and also the movement of the lock shaft are generated by one actuation means. This would be possible for example by an appropriate connection of the two mould carrier parts in the region of the main shaft. By operating the actuation means, the first mould carrier part could then also be moved and, by virtue of a movement of the first mould carrier part, the second mould carrier part 6b could also be moved. In this case, a coupling could take place for example by virtue of toothed wheels and the like.

It will be apparent to those skilled in the art that various modifications and variations can be made to the apparatus and method for transforming plastic preforms into plastic containers of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. Apparatus for transforming plastic preforms into plastic containers, comprising:
   at least one blow moulding station arranged on a movable carrier, the blow moulding station including
      a blow mould carrier for holding a blow mould, the blow mould carrier including
         a first blow mould carrier part, and
         a second blow mould carrier part, the second blow mould carrier part being pivotable with respect to the first blow mould carrier part relative to a predefined first pivot axis in order to open and close the blow mould; and
      a lock mechanism for locking the first blow mould carrier part with respect to the second blow mould carrier part, the lock mechanism including
         a first lock element arranged at least indirectly on the first blow mould carrier part, and
         a second lock element arranged at least indirectly on the second blow mould carrier part, the first and second lock elements cooperating in a locked state of the blow mould carrier parts,
   wherein at least the first lock element is movable with respect to the carrier relative to a second predefined axis, and
   wherein the pivoting movement of the first blow mould carrier part and the movement of the first lock element are coupled to one another by means of a coupling device in such a way that, at least at times during a movement of the first lock element relative to the second predefined axis, the second predefined axis moves with respect to the carrier in a direction perpendicular to the second axis.

2. Apparatus according to claim 1, wherein the apparatus comprises a clean chamber which is separated from a surrounding environment by at least one wall and inside which the blow moulding station is moved.

3. Apparatus according to claim 1, wherein the second predefined axis is a pivot axis and the first lock element is pivotable relative to this second pivot axis, which is preferably arranged in a stationary manner with respect to the first blow mould carrier part.

4. Apparatus according to claim 1, wherein the first lock element is movable along the axis.

5. Apparatus according to claim 2, wherein the coupling device is arranged outside the clean chamber.

6. Apparatus according to claim 1, wherein the second blow mould carrier part is pivotable relative to a predefined pivot axis.

7. Apparatus according to claim 4, wherein the first blow mould carrier part is pivotable through a first predefined pivot angle and the second blow mould carrier part is pivotable through a second predefined pivot angle, and the second pivot angle is larger than the first pivot angle.

8. Apparatus according to claim 1, wherein a pivoting shaft which defines the pivot axis extends through a wall and the movements of the pivoting shaft are sealed off by means of a sealing device.

9. Apparatus according to claim 1, wherein the coupling device comprises a lever for pivoting the blow mould carrier part relative to the first pivot axis.

10. Apparatus according to claim 1, wherein the coupling device comprises a lever arm which is arranged on a pivoting shaft, which defines the pivot axis, in a manner such as to rotate therewith, and is arranged in a manner articulated to a further pivoting arm.

11. Method for transforming plastic preforms into plastic containers, the method comprising:
   transforming a plastic preform into a plastic container in a blow moulding station arranged on a movable carrier;
   pivoting a first blow mould carrier part of the blow moulding station relative to a first pivot axis;
   locking the first blow mould carrier part and a second blow mould carrier part of the blow moulding station with respect to one another by means of a lock mechanism;
   moving a first lock element relative to a second axis in order to lock the first and second blow mould carrier parts; and
   moving the second axis, during the movement of the first lock element, with respect to the carrier in a direction perpendicular to the second axis.

12. Method according to claim 11, wherein the first blow mould carrier part and the second blow mould carrier part, during a process of opening the blow moulding station, reach their respective open positions at different points in time.

13. Apparatus for transforming plastic preforms into plastic containers, comprising:
   at least one blow moulding station arranged on a movable carrier, the blow moulding station including
      a blow mould carrier for holding a blow mould, the blow mould carrier including
         a first blow mould carrier part, and
         a second blow mould carrier part, the second blow mould carrier part being pivotable with respect to the first blow mould carrier part relative to a predefined first pivot axis in order to open and close the blow mould;
      a lock mechanism for locking the first blow mould carrier part with respect to the second blow mould carrier part, the lock mechanism including
         a first lock element arranged at least indirectly on the first blow mould carrier part, and
         a second lock element arranged at least indirectly on the second blow mould carrier part, the first and second lock elements cooperating in a locked state of the blow mould carrier parts, at least the first lock element being movable with respect to the carrier relative to a second predefined axis; and
      a coupling device configured to couple the pivoting movement of the first blow mould carrier part and the movement of the first lock element to one another in such a way that, at least at times during a movement of the first lock element relative to the second predefined axis, the second predefined axis moves with respect to the carrier in a direction perpendicular to the second axis.

14. Apparatus according to claim 1, wherein the coupling device includes a shaft that moves the first blow mould carrier part and the first lock element.

15. Method for transforming plastic preforms into plastic containers according to claim 11, wherein the step of moving the first lock element and the carrier includes the step of rotating a shaft.

16. Apparatus for transforming plastic preforms into plastic containers according to claim 13, wherein the coupling device includes a shaft that moves the first blow mould carrier part and the first lock element.

17. Apparatus for transforming plastic preforms into plastic containers according to claim 8, wherein the coupling device includes a shaft that moves the first blow mould part and the first lock element.

* * * * *